US010389659B2

(12) United States Patent
Janhar et al.

(10) Patent No.: US 10,389,659 B2
(45) Date of Patent: Aug. 20, 2019

(54) UNIVERSAL MULTIPROTOCOL INDUSTRIAL DATA LOGGER

(71) Applicant: LAM RESEARCH CORPORATION, Fremont, CA (US)

(72) Inventors: Ales Janhar, San Ramon, CA (US); Behzad Lajevardi, Fremont, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 44 days.

(21) Appl. No.: 15/717,124

(22) Filed: Sep. 27, 2017

(65) Prior Publication Data

US 2019/0097950 A1 Mar. 28, 2019

(51) Int. Cl.

| | |
|---|---|
| ***H04L 12/861*** | (2013.01) |
| ***H04L 29/06*** | (2006.01) |
| ***H04J 3/06*** | (2006.01) |
| *G05B 15/02* | (2006.01) |
| *H04L 29/08* | (2006.01) |

(52) U.S. Cl.

CPC .......... *H04L 49/9047* (2013.01); *H04J 3/067* (2013.01); *H04L 69/04* (2013.01); *H04L 69/18* (2013.01); *G05B 15/02* (2013.01); *H04L 69/323* (2013.01)

(58) Field of Classification Search

CPC ............. H04L 2201/84; H04L 67/1097; H04L 67/1095; Y02D 10/14

See application file for complete search history.

(56) References Cited

U.S. PATENT DOCUMENTS

| | | | | |
|---|---|---|---|---|
| 9,639,294 | B2 * | 5/2017 | Prahlad | G06F 17/30212 |
| 2010/0226444 | A1 * | 9/2010 | Thevathasan | H04N 21/2187 375/240.29 |
| 2014/0372198 | A1 * | 12/2014 | Goldfinger | G07G 1/14 705/14.33 |
| 2017/0309088 | A1 * | 10/2017 | Arya | H04L 43/0811 |
| 2017/0353550 | A1 * | 12/2017 | Mutalik | H04L 67/1095 |

* cited by examiner

*Primary Examiner* — Shukri Taha

(57) ABSTRACT

A data capture module includes a first port configured to receive first data transmitted from a first component to a second component of a substrate processing system, a second port configured to received second data transmitted from the second component to the first component, a first data stream forwarding module configured to duplicate the first data, forward the duplicated first data to the second port, and output the first data, and a second data stream forwarding module configured to duplicate the second data, forward the duplicated second data to the first port, and output the second data. The first port is configured to transmit the duplicated second data to the first component and the second port is configured to transmit the duplicated first data to the second component. A data compression module is configured to compress the first and second data. Data storage is configured to store the compressed data.

17 Claims, 4 Drawing Sheets

UNIVERSAL MULTIPROTOCOL INDUSTRIAL DATA LOGGER

FIELD

The present disclosure relates to monitoring and storing data in a substrate processing system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems may be used to perform etching, deposition, and/or other treatment of substrates such as semiconductor wafers. Example processes that may be performed on a substrate include, but are not limited to, a plasma enhanced chemical vapor deposition (PECVD) process, a chemically enhanced plasma vapor deposition (CEPVD) process, an ion implantation process, and/or other etch, deposition, and cleaning processes. A substrate may be arranged on a substrate support such as a pedestal, an electrostatic chuck (ESC), etc. in a processing chamber of the substrate processing system. For example, during etching in a PECVD process, a gas mixture including one or more precursors is introduced into the processing chamber and plasma is struck to etch the substrate.

SUMMARY

A data capture module for capturing data transmitted between first and second components of a substrate processing system includes a first port configured to receive first data transmitted from the first component to the second component, a second port configured to received second data transmitted from the second component to the first component, a first data stream forwarding module configured to duplicate the first data, forward the duplicated first data to the second port, and output the first data, and a second data stream forwarding module configured to duplicate the second data, forward the duplicated second data to the first port, and output the second data. The first port is configured to transmit the duplicated second data to the first component and the second port is configured to transmit the duplicated first data to the second component. A data compression module is configured to compress the first data output from the first data stream forwarding module and the second data output from the second data stream forwarding module. Data storage is configured to store the compressed first data and the compressed second data.

In other features, the data capture module further includes a first physical layer device configured to provide the first data received at the first port to the first data stream forwarding module and a second physical layer device configured to provide the second data received at the second port to the second data stream forwarding module. A media access control (MAC) processing module is arranged between (i) the first and second data stream forwarding modules and (ii) the data compression module and the is configured to insert timestamps into the first data and the second data. A synchronization module is configured to generate the timestamps based on a master clock signal.

In other features, the data capture module further includes a first hardware buffer arranged between the first data stream forwarding module and the data compression module. The first hardware buffer is configured to store the first data prior to the data compression module compressing the first data. A second hardware buffer is arranged between the second data stream forwarding module and the data compression module. The second hardware buffer is configured to store the second data prior to the data compression module compressing the second data. The data capture module includes a third port configured to provide access to the stored compressed data.

In other features, the first data and the second data are transmitted between the first component and the second component of the substrate processing system according to a predetermined data communication protocol, and the data compression module is configured to compress the first data and the second data using a data compression protocol corresponding to the predetermined data communication protocol. The data compression module is configured to (i) select one of a plurality of data compression protocols based on the first data and the second data and (ii) compress the first data and the second data using the selected data compression protocol.

In other features, one of the first component and the second component includes the data capture module. The first component corresponds to one of a tool controller, a chamber controller, a substrate processing chamber, and a port server of a substrate processing tool and the second component corresponds to another one of the tool controller, the chamber controller, the substrate processing chamber, and the port server of the substrate processing tool.

A method for capturing data transmitted between first and second components of a substrate processing system includes receiving, at a first port, first data transmitted from the first component to the second component, receiving, at a second port, second data transmitted from the second component to the first component, duplicating the first data, forwarding the duplicated first data to the second port, and outputting the first data, duplicating the second data, forwarding the duplicated second data to the first port, and outputting the second data, transmitting, from the first port, the duplicated second data to the first component, transmitting, from the second port, the duplicated first data to the second component, compressing the first data and the second data, and storing the compressed first data and the compressed second data.

In other features, the method further includes providing the first data from the first port using a first physical layer device, providing the second data from the second port using a second physical layer device, inserting timestamps into the first data and the second data, generating the timestamps based on a master clock signal, buffering the first data prior to the compressing the first data, buffering the second data prior to compressing the second data, and providing access to the stored compressed data using a third port.

In other features, the first data and the second data are transmitted between the first component and the second component of the substrate processing system according to a predetermined data communication protocol, and the compressing the first data and the second data includes using a data compression protocol corresponding to the predetermined data communication protocol. The method further includes selecting one of a plurality of data compression protocols based on the first data and the second data and compressing the first data and the second data using the selected data compression protocol.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A substrate processing system may include one or more components for monitoring data associated with operation of the substrate processing system. Example data includes, but is not limited to, data transmitted to and from a substrate processing tool and data transmitted between system controllers and a substrate processing chamber. The data may include control data transmitted to the tool, sensor data, etc. Example components include a host computing device (e.g., a personal computer, or PC), embedded systems input/output (I/O) controllers, and commercial off-the-shelf (COTS) I/O devices. The various components may communicate using network layer protocols such as Ethernet protocol, internet protocol (IP), EtherCat, etc. The system may include a data logging device such as a data sniffer or data logging software applications implemented on a host computer.

Because of the large amount of data generated by the substrate processing system and limited bandwidth and storage availability, the data logging device is configured to sample only portions of the data (e.g., according to a sampling rate, in response to selected trigger events or conditions, etc.) and/or may filter data. Accordingly, the stored data is only a portion of all of the data generated by the system, and the data that is not sampled or is filtered out is not recoverable. Further, the data may correspond to only one of operational technology (OT) or information technology (IT) traffic types, and the data logging device may be limited to a selected one of the traffic types.

Data monitoring systems and methods according to the principles of the present disclosure implement a data capture module configured to monitor/capture, compress, and store all data communicated to, from, and within the substrate processing system. For example, the data capture module continuously monitors all communication traffic, including both OT and IT traffic types, on a data link layer (e.g., independent of network layer and higher layers, such as an application and other control layers). Raw frames are compressed according to a lossless data compression method and stored in integrated non-volatile memory. Accordingly, every data frame/packet may be captured and stored and no data is lost or filtered out. In some examples, each data frame may be stored with a corresponding timestamp (using a central or master system clock).

Figure 1:
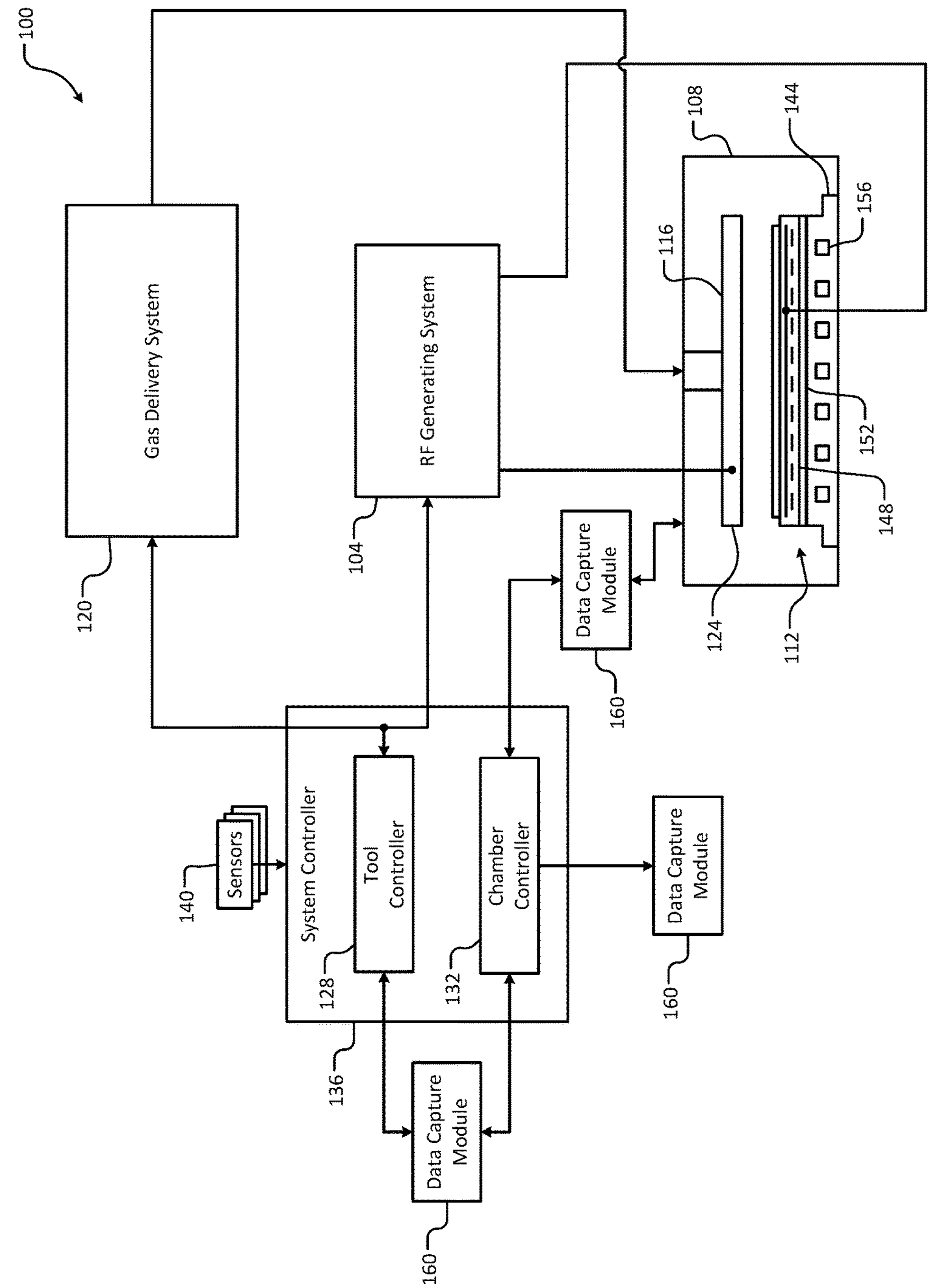
FIG. 1 is a functional block diagram of an example of a substrate processing system incorporating a data capture module in accordance with the present disclosure.

Referring now to FIG. 1, an example of a substrate processing system 100 is shown. The substrate processing system 100 includes an RF generating system 104 configured to generate plasma within a processing chamber 108. The processing chamber 108 comprises a substrate support 112 that supports a substrate 116. The substrate support 112 may include an electrostatic chuck, a mechanical chuck or other type of chuck. The plasma is generated to deposit film or to etch the substrate 116. A gas delivery system 120 may be used to supply a gas mixture (e.g., process gases, purge gases, etc.) to the processing chamber 108 via an upper electrode (e.g., a showerhead) 124).

One or more controllers (e.g., a tool controller 128, a chamber controller 132, etc.) may be used to control various processes, including, but not limited to, deposition and etching, heating and cooling of the substrate support 112, etc. In some examples, a single controller (e.g., a system controller 136) implements functions of both the tool controller 128 and the chamber controller 132). The controllers 128/132 54 monitor process parameters such as temperature, pressure, etc. and control delivery of the gas mixture, striking, maintaining and extinguishing the plasma, removal of reactants, supply of cooling gas, etc.

The controllers 128/132 may receive input signals (e.g., sensor data, control data, etc.) from components of the substrate processing system 100 and based on the input signals control operation of the RF generating system 104, the gas delivery system 120, the processing chamber 108, and/or other components of the substrate processing system 100. For example, one or more sensors 140 located throughout the RF generating system 104, the gas delivery system 120, the processing chamber 108, and/or other components of the substrate processing system 100 provide the sensor data. The sensors 140 detect, for example, supplied RF voltages, temperatures, gas and/or coolant flow rates, and gas and/or coolant pressures.

The upper electrode 124 introduces and distributes gases into the processing chamber 108. The substrate support 112 includes a conductive baseplate 144 that acts as a lower electrode. The baseplate 144 may support a heating plate 148, which may be formed at least partially of a ceramic material. A thermal resistance layer 152 may be arranged between the heating plate 148 and the baseplate 144. The baseplate 144 may include one or more coolant channels 156 for flowing coolant through the baseplate 144. The RF generating system 104 generates a bias RF voltage to bias one of the lower electrode (e.g., the baseplate 144 of the substrate support 112) and the upper electrode 124 during operation. The other one of the upper electrode 124 and the baseplate 144 may be DC grounded, AC grounded, or at a floating potential.

The substrate processing system 100 according to the principles of the present disclosure includes one or more data capture modules 160. The data capture modules 160 are configured to monitor, capture, compress, and store all data communicated between the controllers 128/132, the processing chamber 108, the RF generating system 104, the gas delivery system 120, the sensors 140, and/or other components of the substrate processing system 100 as described below in more detail.

Figure 2:
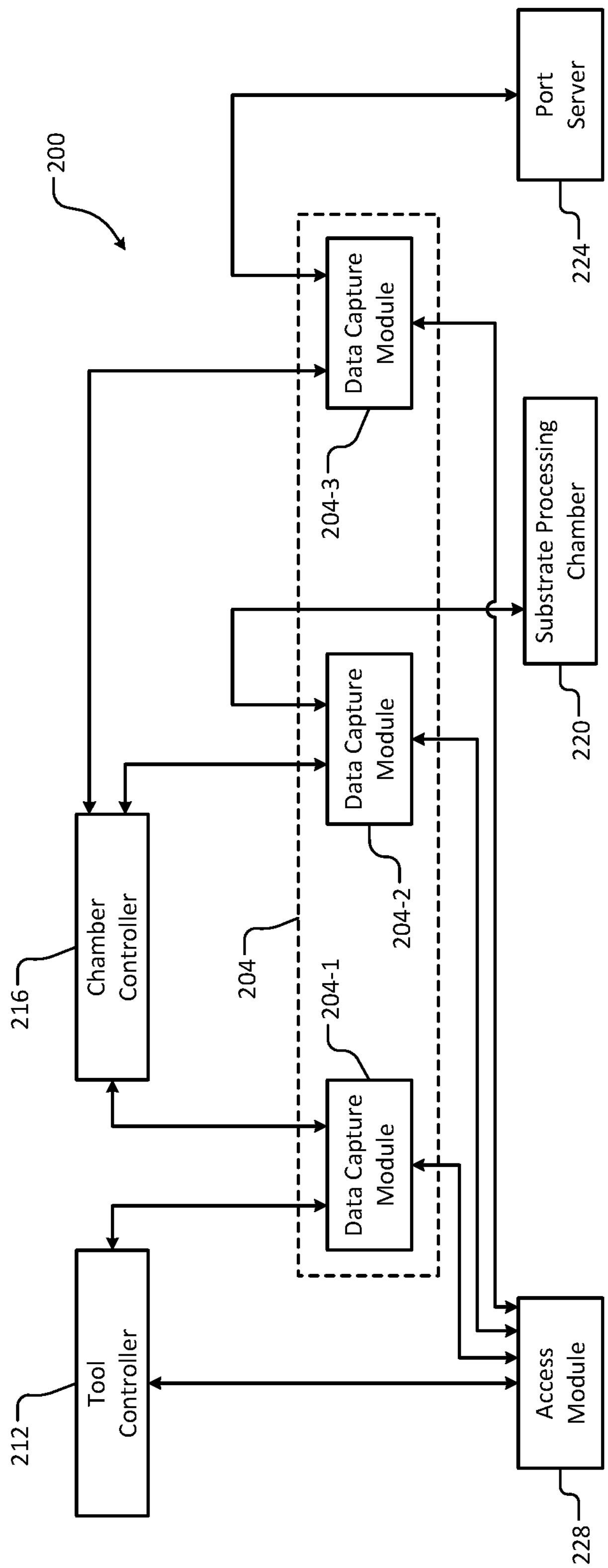
FIG. 2 is a functional block diagram of an example data monitoring system in accordance with the present disclosure.

Referring now to FIG. 2, an example data monitoring system 200 including relevant components of the substrate processing system 100 of FIG. 1 is shown. The data monitoring system 200 includes one or more data capture modules 204-1, 204-2, and 204-3 (referred to collectively as data capture module(s) 204) arranged and configured to capture and store data transmitted between components of the system 200. Although shown as separate, standalone modules, in some examples the data capture modules 204 may correspond to a single data capture module 204. In some examples, the data capture modules 204 may be integrated within a tool controller 212, a chamber controller 216, etc.

The data capture modules 204 are arranged inline between respective components of the data monitoring system 200. For example, the data capture module 204-1 is arranged between a tool controller 212 and a chamber controller 216. Accordingly, all data transmitted between the tool controller 212 and the chamber controller 216, in either direction, passes through the data capture module 204-1. Similarly, the data capture module 204-2 is arranged between the chamber controller 216 and a substrate processing chamber 220. The data capture module 204-3 is arranged between the chamber controller 216 and a port server 224 of a substrate processing tool (not shown) corresponding to the substrate processing chamber 220.

The data capture modules 204 monitor, compress, and store data in real-time (e.g., by capturing all data on a data link layer). For example, data paths to, from, and within the data capture modules 204 and components of the data capture modules 204 are implemented with hardware to achieve real-time data capture. Further, because the data capture modules 204 are arranged in-line with respect to data flows between the various components as described above, delays associated with packet forwarding are avoided, external hubs and switches are eliminated, etc. Data stored in the data capture modules 204 may be subsequently accessed by a user (e.g., via an access module 228 configured to interface with the data capture modules 204, which may correspond to a dedicated data management device, a host PC, etc.).

Figure 3:
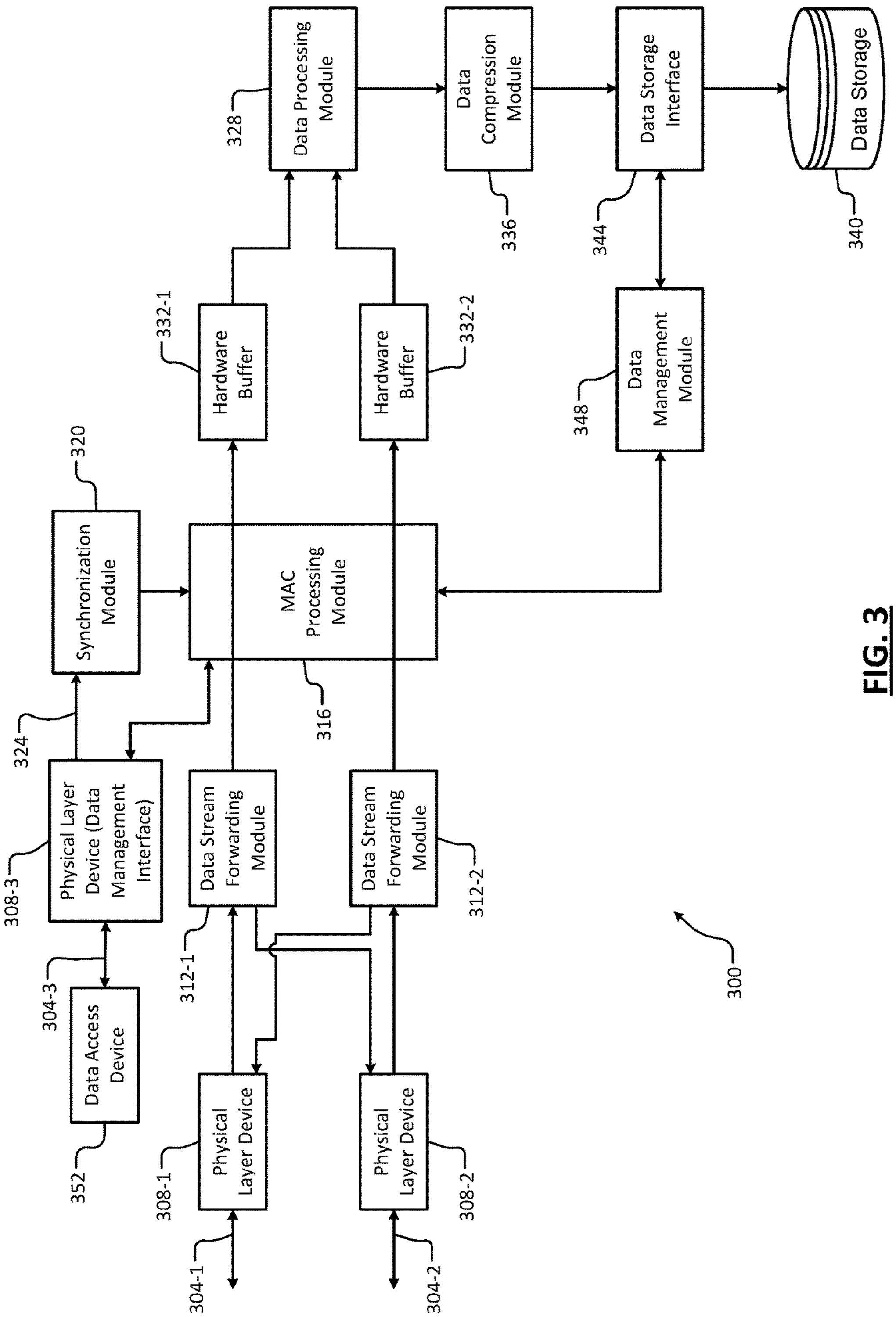
FIG. 3 is a functional block diagram of an example data capture module in accordance with the present disclosure.

Referring now to FIG. 3, an example data capture module 300 is shown. The data capture module 300 includes ports 304-1, 304-2, and 304-3, referred to collectively as ports 304, shown schematically. The ports 304 correspond to data interfaces between physical layer devices 308-1, 308-2, and 308-3 (referred to collectively as physical layer devices 308 within the data capture module 300 and one or more external devices. For example, the physical layer devices 308-1 and 308-2 may receive data transmitted by respective devices in a data flow path (e.g., in a data flow path between the tool controller 212 and the chamber controller 216, in a data flow path between the chamber controller 216 and the substrate processing chamber 220, in a data flow path between the chamber controller 216 and the port server 224, etc.) as described below in more detail. Conversely, the physical layer device 308-3 may correspond to a data management interface configured to provide access to data stored within the data capture module 300. For example purposes, the data capture module 300 as described below is analogous to the data capture module 204-3 arranged inline between the chamber controller 216 and the port server 224.

In one example, the physical layer devices 308-1 and 308-2 each communicate with data stream forwarding modules 312-1 and 312-2, referred to collectively as data stream forwarding modules 312. Each of the data stream forwarding modules 312 receives data from a respective one of the physical layer devices 308-1 and 308-2 (in a corresponding direction of the data flow path), forwards the received data to media access control (MAC) processing module 316, and duplicates the data to be provided to the other one of the physical layer devices 308-1 and 308-2. In this manner, all data being transmitted in either direction (e.g., from the chamber controller 216 to the port server 224 and/or from the port server 224 to the chamber controller 216) passes through the data capture module 300 to be captured and stored. In other words, the data capture module 300 supports a full-duplex protocol. Further, because the data stream forwarding modules 312 duplicate and forward the respective data received via the physical layer devices 308 prior to subsequent processing (e.g., compression, storage, etc.) within the data capture module 300, the data passes through the data capture module 300 with no inserted delay, resulting in real-time data forwarding. Although shown as separate modules 312, the data stream forwarding modules 312 may be implemented as a single data stream forwarding module 312.

The MAC processing module 316 processes the dual streams of data received from the respective data stream forwarding modules 312. For example, the MAC processing module 316 may insert timestamps into data packets in the respective data streams. Since the data monitoring system 200 may include multiple devices (e.g., multiple data sources, multiple ones of the data capture modules 300, etc.), local timestamps may not be consistent. Accordingly, captured data may be stored according to a master or global clock instead of local timestamps. For example, a synchronization module 320 may receive a master clock signal 324 (e.g., in accordance with an external master clock signal received via the physical layer device 308-3) and generate timestamps in accordance with a time indicated by the master clock signal 324. The synchronization module 320 provides the timestamps to the MAC processing module 320.

The MAC processing module 316 forwards the data (including the timestamps) to data processing module 328. In some examples, the data capture module 300 includes hardware buffers 332-1 and 332-2 (referred to collectively as hardware buffers 332) for the respective data streams. For example, subsequent processing (e.g., processing of the data subsequent to processing performed by the MAC processing module 316, such as compression, storage, etc.) may require a greater amount of time than the real-time capture of the data. Accordingly, the hardware buffers 332 may temporarily store the captured data prior to subsequent processing. Since the data includes the timestamps inserted by the MAC processing module 316, any delay in subsequent processing caused by temporary buffering does not affect storage of the data with accurate timing information, and the data capture module 300 can continue to capture all data received at the ports 304.

The data processing module 328 may perform one or more pre-processing functions on the data. For example, data processing module 328 may combine the data streams into a single data stream, align the data packets from the different data streams according to timestamps, modify the data packets to indicate which data stream (and, therefore, which of the physical layer devices 304 and respective data source) the data packets were transmitted in, etc. The data packets may further include information indicating a source of the data packet, a destination of the data packet, etc.

The data processing module 328 provides the data to data compression module 336. The data compression module 336 compresses the data according to any suitable data compression protocol. For example, data transmitted between components of the data monitoring system 200 may be transmitted according to one or more communication protocols including, but not limited to, EtherCat protocol, transmission control protocol (TCP), internet protocol (IP), TCP/IP, user datagram protocol (UDP), etc. The physical layer devices 308-1 and 308-2 receive the data in a format corresponding to the communication protocol and the data is provided to the data compression module 336 (via the data stream forwarding modules 312, the MAC processing module 316, the data processing module 328, the hardware buffers 332) in the same format. In other words, other than nominal changes to the content of the data packets (e.g., the addition of the timestamps), the data is compressed and stored without changing the data to a different format or protocol. Further, the data capture module 300 does not filter out any of the data received by the physical layer devices 308.

Accordingly, the data compression module 336 is configured to perform compression on data according to one or more data compression protocols. In some examples, the data compression module 336 is configured to execute a data compression protocol according to a predetermined communication protocol or data format implemented within the data monitoring system. In other examples, the data compression module 336 is configured to execute a plurality of data compression protocols and select one of the plurality of data compression protocols in accordance with the format of the received data. For example, if the data corresponds to EtherCat data, the data compression module 336 may select an EtherCat data compression protocol and compress the Ethercat data accordingly. Conversely, if the data is TCP/IP data, the data compression module 336 may select a TCP/IP data compression protocol and compress the TCP/IP data accordingly. Although shown as a single data stream, in some examples the data compression module 336 may be configured to receive, compress, and store each of the data streams (i.e., respective data streams including the data received via the port 304-1 and the data received via the port 304-2) independently.

The data compression module 336 provides the compressed data to data storage 340 (e.g., via a data storage interface 344). For example only, the data storage 340 corresponds to high capacity (e.g., 10 or more terabytes) disk and/or semiconductor storage. In some examples, at least a portion of the data storage 340 may be located external to the data capture module 300 (e.g., in cloud storage). In some examples, the data storage 340 may be configured as a ring storage buffer that automatically deletes/overwrites the oldest stored data.

The data capture module 300 may include a data management module 348 configured to provide access to the compressed data stored in the data storage 340. For example, the data management module 348 function as an interface between an external data access device 352 and the data storage 340 (e.g., via the physical layer device 308-3 and the MAC processing module 316). For example, the data access device 352 may correspond to a device, such as a host PC, configured to implement the access module 228. A user may retrieve, search, sort, modify (e.g., delete) the stored compressed data via the data access device 352. For example, the data may be searched and retrieved according to source, destination, time frame (e.g., in accordance with the timestamps), etc.

In this manner, the data capture module 300 as described above is configured to monitor and receive all data transmitted between corresponding components of the data monitoring system 200 while independently compressing and storing the received data. In other words, all of the data may be received and captured in real-time (e.g., in a data forwarding path corresponding to the ports 304, the physical layer devices 308, and the data stream forwarding modules 312), while compression and storage of the data are performed in a separate, independent hardware path (e.g., corresponding to the MAC processing module 316, hardware buffers 332, the data compression module 336, etc. and related processing and functions).

Figure 4:
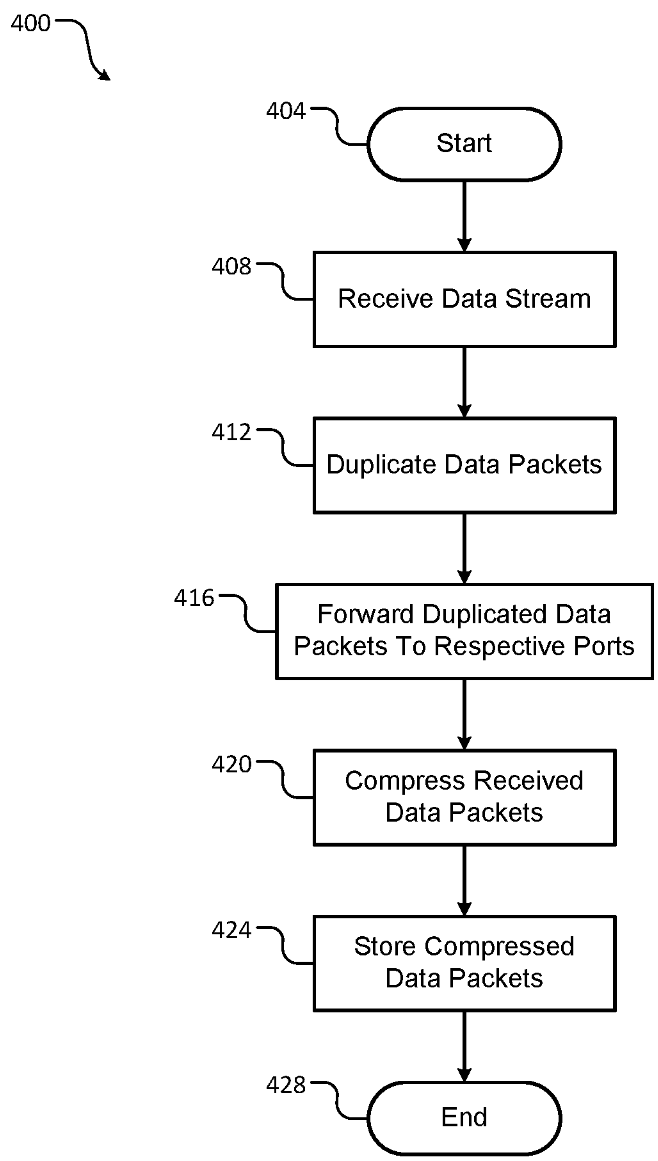
FIG. 4 illustrates steps of an example data capture method in accordance with the present disclosure.

Referring now to FIG. 4, an example data capture method 400 according to the principles of the present disclosure begins at 404. For example, components of the data capture module 300 are configured to execute the method 400. At 408, the data capture module 300 receives (e.g., via respective ports 304, physical layer devices 308, etc.) a bi-directional data stream including data packets transmitted between components of a substrate processing system. At 412, the data capture module 300 (e.g., the data stream forwarding modules 312) duplicates the data packets received in the data stream. At 416, the data capture module 300 forwards the duplicated data packets to be transmitted from the ports 304 while also providing the received data packets to upstream hardware components of the data capture module 300 (e.g., to the MAC processing module 316, the hardware buffers 332, etc.).

At 420, the data capture module 300 (e.g., the data compression module 336) compresses the received data packets. For example, the data compression module 336 compresses the data packets according to a predetermined data compression protocol. In another example, the data compression module 336 determines a format of the data packets (e.g., according to a corresponding communication protocol used for transmitting the data packets within the data monitoring system 200) and selects a data compression protocol from a plurality of available data compression protocols in accordance with the determined format. At 424, the compressed data is stored (e.g., in the data storage 340). The method 400 ends at 428.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A data capture module for capturing data transmitted between first and second components of a substrate processing system, the data capture module comprising:

a first port connected to the substrate processing system and configured to receive first data transmitted from the first component of the substrate processing system to the second component of the substrate processing system;

a second port connected to the substrate processing system and configured to received second data transmitted from the second component of the substrate processing system to the first component of the substrate processing system;

a first data stream forwarding module configured to (i) duplicate the first data, (ii) forward the duplicated first data to the second port, and (iii) output the first data;

a second data stream forwarding module configured to (i) duplicate the second data, (ii) forward the duplicated second data to the first port, and (iii) output the second data, wherein the first port is configured to transmit the duplicated second data to the first component of the substrate processing system and the second port is configured to transmit the duplicated first data to the second component of the substrate processing system;

a data compression module configured to compress the first data output from the first data stream forwarding module and the second data output from the second data stream forwarding module; and data storage configured to store the compressed first data and the compressed second data, wherein (i) the first component corresponds to one of a tool controller, a chamber controller, a substrate processing chamber, and a port server of a substrate processing tool and (ii) the second component corresponds to another one of the tool controller, the chamber controller, the substrate processing chamber, and the port server of the substrate processing tool.

2. The data capture module of claim 1, further comprising:

a first physical layer device configured to provide the first data received at the first port to the first data stream forwarding module;

and a second physical layer device configured to provide the second data received at the second port to the second data stream forwarding module.

3. The data capture module of claim 1, further comprising a media access control (MAC) processing module arranged between (i) the first and second data stream forwarding modules and (ii) the data compression module, wherein the MAC processing module is configured to insert timestamps into the first data and the second data.

4. The data capture module of claim 3, further comprising a synchronization module configured to generate the timestamps based on a master clock signal.

5. The data capture module of claim 1, further comprising:

a first hardware buffer arranged between the first data stream forwarding module and the data compression module, wherein the first hardware buffer is configured to store the first data prior to the data compression module compressing the first data; and a second hardware buffer arranged between the second data stream forwarding module and the data compression module, wherein the second hardware buffer is configured to store the second data prior to the data compression module compressing the second data.

6. The data capture module of claim 1, further comprising:

a third port configured to provide access to the stored compressed data.

7. The data capture module of claim 1, wherein the first data and the second data are transmitted between the first component and the second component of the substrate processing system according to a predetermined data communication protocol, and wherein the data compression module is configured to compress the first data and the second data using a data compression protocol corresponding to the predetermined data communication protocol.

8. The data capture module of claim 1, wherein the data compression module is configured to (i) select one of a plurality of data compression protocols based on the first data and the second data and (ii) compress the first data and the second data using the selected data compression protocol.

9. A substrate processing system comprising:

the data capture module of claim 1;

the first component; and the second component, wherein one of the first component and the second component includes the data capture module.

10. A method for capturing data transmitted between first and second components of a substrate processing system, the method comprising:

receiving, at a first port connected to the substrate processing system, first data transmitted from the first component of the substrate processing system to the second component of the substrate processing system;

receiving, at a second port connected to the substrate processing system, second data transmitted from the second component of the substrate processing system to the first component of the substrate processing system;

duplicating the first data, forwarding the duplicated first data to the second port, and outputting the first data;

duplicating the second data, forwarding the duplicated second data to the first port, and outputting the second data, transmitting, from the first port, the duplicated second data to the first component of the substrate processing system;

transmitting, from the second port, the duplicated first data to the second component of the substrate processing system;

compressing the first data and the second data; and storing the compressed first data and the compressed second data, wherein (i) the first component corresponds to one of a tool controller, a chamber controller, a substrate processing chamber, and a port server of a substrate processing tool and (ii) the second component corresponds to another one of the tool controller, the chamber controller, the substrate processing chamber, and the port server of the substrate processing tool.

11. The method of claim 10, further comprising:

providing the first data from the first port using a first physical layer device; and providing the second data from the second port using a second physical layer device.

12. The method of claim 10, further comprising inserting timestamps into the first data and the second data.

13. The method of claim 12, further comprising generating the timestamps based on a master clock signal.

14. The method of claim 10, further comprising:

buffering the first data prior to the compressing the first data; and buffering the second data prior to compressing the second data.

15. The method of claim 10, further comprising:

provide access to the stored compressed data using a third port.

16. The method of claim 10, wherein the first data and the second data are transmitted between the first component and the second component of the substrate processing system according to a predetermined data communication protocol, and wherein the compressing the first data and the second data includes using a data compression protocol corresponding to the predetermined data communication protocol.

17. The method of claim 10, further comprising (i) selecting one of a plurality of data compression protocols based on the first data and the second data and (ii) compressing the first data and the second data using the selected data compression protocol.

* * * * *